United States Patent
Dow et al.

(10) Patent No.: US 7,716,051 B2
(45) Date of Patent: May 11, 2010

(54) DISTRIBUTED VOICE RECOGNITION SYSTEM AND METHOD

(75) Inventors: Barry Neil Dow, Hampshire (GB); Stephen Graham Lawrence, Southampton (GB); John Brian Pickering, Winchester (GB)

(73) Assignee: Nuance Communications, Inc., Burlington, MA (US)

( * ) Notice: Subject to any disclaimer, the term of this patent is extended or adjusted under 35 U.S.C. 154(b) by 776 days.

(21) Appl. No.: 11/427,029

(22) Filed: Jun. 28, 2006

(65) Prior Publication Data

US 2007/0011010 A1   Jan. 11, 2007

(30) Foreign Application Priority Data

Jul. 6, 2005   (GB) .................... 0513820.1

(51) Int. Cl.
*G10L 15/04* (2006.01)
*G10L 15/00* (2006.01)
*G10L 15/26* (2006.01)

(52) U.S. Cl. .............. 704/254; 704/235; 704/251; 704/252

(58) Field of Classification Search ........... None
See application file for complete search history.

(56) References Cited

U.S. PATENT DOCUMENTS

| 5,638,425 | A  | * | 6/1997 | Meador et al. ........... 379/88.01 |
| 6,122,613 | A  | * | 9/2000 | Baker ...................... 704/235 |
| 6,487,534 | B1 | * | 11/2002 | Thelen et al. ............... 704/270 |
| 6,898,567 | B2 | * | 5/2005 | Balasuriya .................. 704/231 |
| 2007/0061147 | A1 | * | 3/2007 | Monne et al. ............. 704/270.1 |

FOREIGN PATENT DOCUMENTS

WO   02/103675 A1   12/2002

* cited by examiner

*Primary Examiner*—Matthew J Sked
(74) *Attorney, Agent, or Firm*—Wolf, Greenfield & Sacks, P.C.

(57) ABSTRACT

A distributed voice recognition system (500) and method employs principles of bottom-up (i.e., raw input) and top-down (i.e., prediction based on past experience) processing to perform client-side and server-side processing by (i) at the client-side, replacing application data by a phonotactic table (504); (ii) at the server-side, tracking separate confidence scores for matches against an acoustic model and comparison to a grammar; and (iii) at the server-side using a contention resolver (514) to weight the client-side and server-side results to establish a single output which represents the collaboration between client-side processing and server-side processing.

24 Claims, 5 Drawing Sheets

PHONOTACTIC TABLE 602

|   | EE | IH | ... | S | Z | TD | DD |
|---|----|----|-----|---|---|----|----|
| P | ✓  | ✓  |     | ✓ | ✗ | ✓  | ✗  |
| B | ✓  | ✓  |     | ✗ | ✓ | ✗  | ✓  |
| ⋮ |    |    |     |   |   |    |    |

DISTRIBUTED VOICE RECOGNITION SYSTEM AND METHOD

FIELD OF THE INVENTION

This invention relates to automatic voice or speech recognition (ASR). It is to be understood that the terms speech and voice are herein used interchangeably and co-terminously.

BACKGROUND OF THE INVENTION

In the field of this invention it is known that ASR can be improved by adapting the recognition engine to the specific user (speaker dependent recognition) and to the device used by the user for audio input. It is also known that for general-purpose applications, the preferred implementation involves non-user specific modelling (speaker independent recognition) and a remote server, which does not negotiate or otherwise interact with specifics of the local device.

From patent publication WO-02-103675 there is known a client-server based Distributed Speech Recognition (DSR) system which recognises speech made by a human at a client device and transmitted to a remote server over a network. The system distributes the speech recognition process between the client and the server so that a speaker-dependent language model may be utilized yielding higher accuracy as compared to other DSR systems. Accordingly, the client device is configured to generate a phonetic word graph by performing acoustic recognition using an acoustic model that is trained by the same end-user whose speech is to be recognized; the resulting phonetic word graph is transmitted to the server which handles the language processing and generates a recognized word sequence. However, these approaches have disadvantages. The speaker dependent recognition loses the general applicability of speaker independent recognition, since it will not perform as well for speakers other than the one for which it is trained. Also the speaker independent recognition, especially in a hostile environment such as noisy telephone lines, can show decreased accuracy since it fails to capitalise on the characteristics of the specific device and speaker.

A need therefore exists for distributed voice recognition system and method wherein the above-mentioned disadvantage(s) may be alleviated.

STATEMENT OF INVENTION

In accordance with a first aspect of the present invention there is provided a distributed voice recognition system as claimed in claim 1.

In accordance with a second aspect of the present invention there is provided a distributed voice recognition method as claimed in claim 9, In a preferred embodiment, the present invention provides improved speech recognition accuracy by co-ordinating speaker-specific and speaker-independent recognition implemented in the client and the server-side respectively in accordance with the principles of top-down and bottom-up processing in cognitive psychology.

BRIEF DESCRIPTION OF THE DRAWING(S)

One distributed voice recognition system and method incorporating the present invention will now be described, by way of example only, with reference to the accompanying drawing(s), in which.

DESCRIPTION OF PREFERRED EMBODIMENT(S)

It is known that audio input (speech) can be converted to a machine-readable form (text) using ASR. This can be illustrated with reference to FIG. 1 as described here. The ASR process 100 comprises three common components: the acoustic front-end (AFE) 105, which is responsible for analysing the incoming speech signal 101, the decoder 112, which matches the parameterised audio to its acoustic model 106, and the application or user part 115, the grammar 114 and the associated pronunciation dictionary 113. The ASR process 100 therefore takes an audio signal 101 as input and produces a text string representation 116 as output.

Figure 1:
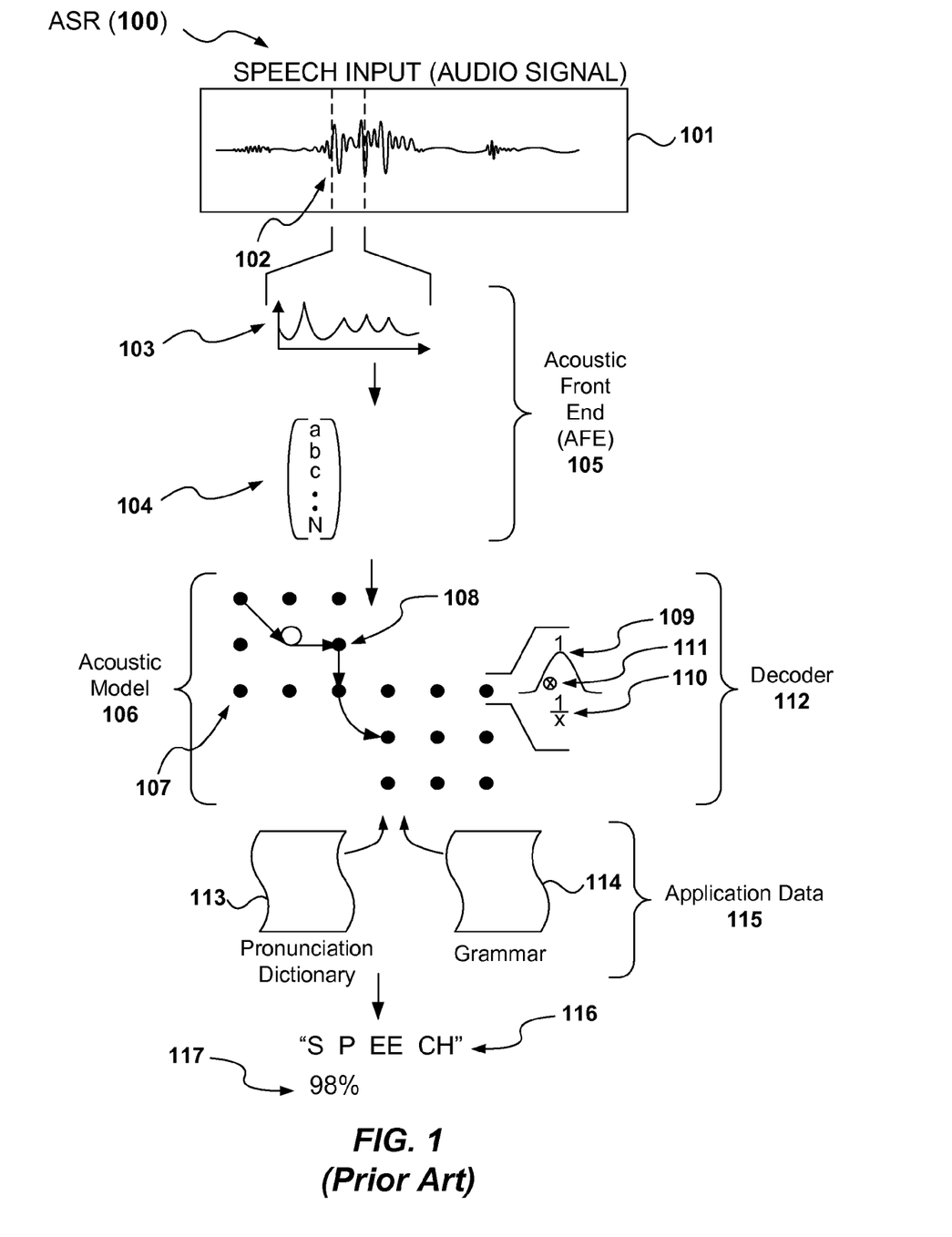
FIG. 1 shows a block-schematic diagram illustrating a known ASR process.

To promote a better understanding of the present invention, this known process 100 will be described in more detail here. The audio signal 101 is first segmented over time into time-slices 102. These may be successive time intervals of say 10 to 50 milliseconds or overlapping. Each time slice 102 is then Hamming windowed, and via Fast Fourier Transform (FFT) a spectral section 103 generated. This process is well known to those practised in signal processing. The curve describing the distribution of spectral energy in 103 (showing level in decibels against frequency) can be represented by a polynomial of a finite number of coefficients. Such a set of coefficients along with an averaged energy level indicator are generated as the output vector 104 of the AFE 105. It should be noted that the vectors may be further normalised for loudness and so forth, and that the signal itself is usually analysed to remove transients and background noise, which may degrade the signal quality and therefore affect recognition accuracy.

The N-dimensional set of coefficients 104 is then passed to the decoder 112. N is equal to the number of coefficients modelled, typically 16 plus loudness for each time slice 102. The vector of coefficients 104 is now compared to each state 107 within an acoustic model 106 of states 107 and transitions 108 between those states. Each state is an N-dimensional normal or Gaussian distribution 109 representing the probability distribution of a given coefficient around the mean value 110. Any given coefficient may fall above or below the mean 110 as shown at 111. Comparing all states 107 with a section of the acoustic model 106 will result in an indication of which mean 110 is closer to the input vector 104 lies. This is deemed the closest match for this time-slice 102 and the process is repeated for each successive time slice. If the closest match is not the same as the previous one, then the transition 108 between this and the previous state 107 is examined. Transitions 108 are also represented probabilistically to indicate the likelihood that the current state could be reached from the previous one (is associated with the same speech sound or associated with the beginning of a following speech sound).

With successive time slices a path is drawn through the acoustic model 106 of successive states 107 and transitions 108. The number of possible pathways is theoretically infinite. However, in practical situations, the application programmer limits the pathways indirectly by specifying a grammar 114. The grammar lists all the words in context that the user is expected to say. For instance, a grammar designed to recognise colours may contain the isolated words "blue", "yellow" and "red", whereas a grammar designed for bank balance enquiries will contain individual words like "account", "balance", "current" in isolation, but also in a context such as "I'd like to know the balance of my current account please". The grammar 114 is then queried at compilation time to establish the pronunciations of all words and therefore phrases that are expected to be encountered in the application. These pronunciations are held in a dictionary 113. At runtime, the grammar 114 and its associated pronunciation dictionary 113 constrain the possible pathways through the acoustic model 106 so that not all states 107 and transitions 108 need to be checked for every time slice 102. Further, although multiple pathways will be retained as the speech signal 101 is processed, some will be lost or 'pruned' as the cumulative probability falls below a given threshold. It should be noted, however, that the pathway and associated cumulative probability is based solely on historical data from the onset of speech: there is no forward prediction.

When all the time slices 102 from the original audio signal 101 have been processed by the AFE 105 and matched within the decoder 112 and checked with the grammar 114, then a result 116 is returned, typically with a confidence value 117 which represents how well the audio signal 101 matched the trained states 107 and transitions 108 within the acoustic model 106.

Figure 2:
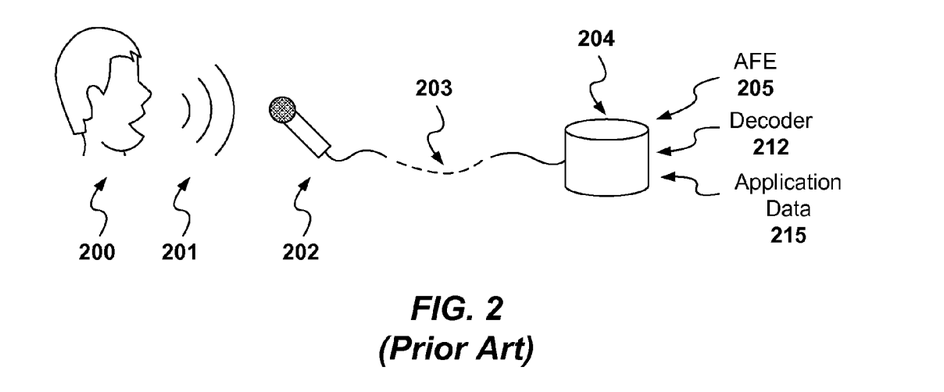
FIG. 2 shows a block-schematic diagram illustrating a typical known implementation of the known ASR process of FIG. 1.

FIG. 2 illustrates a typical implementation of the ASR process 100. A speaker 200 produces speech 201 which is captured by an input device 202, transmitted across a given channel 203, such as a direct hi-fi cable, a telephony channel or a wireless channel and so forth, to a server 204. At the server, both the AFE 205 and the decoder 212 operate as described above, with reference to the application specific data 215 required for a given service. There are, however, certain issues, which will affect recognition performance.

First, the speaker 200 may have certain characteristics such as accent, which are not typical of the acoustic model of the decoder 212, making matching less robust or consistent. Second, the speech signal 201 may be degraded by environment noise, the capabilities of the input device 202 and the transmission channel 203. All of these factors can affect the signal and therefore have a detrimental effect on both the AFE 205 and the decoder 212. In older systems and configurations, a further problem may be the bandwidth of the transmission channel 203 which will lead to delay in processing at the server end 204.

Figure 3:
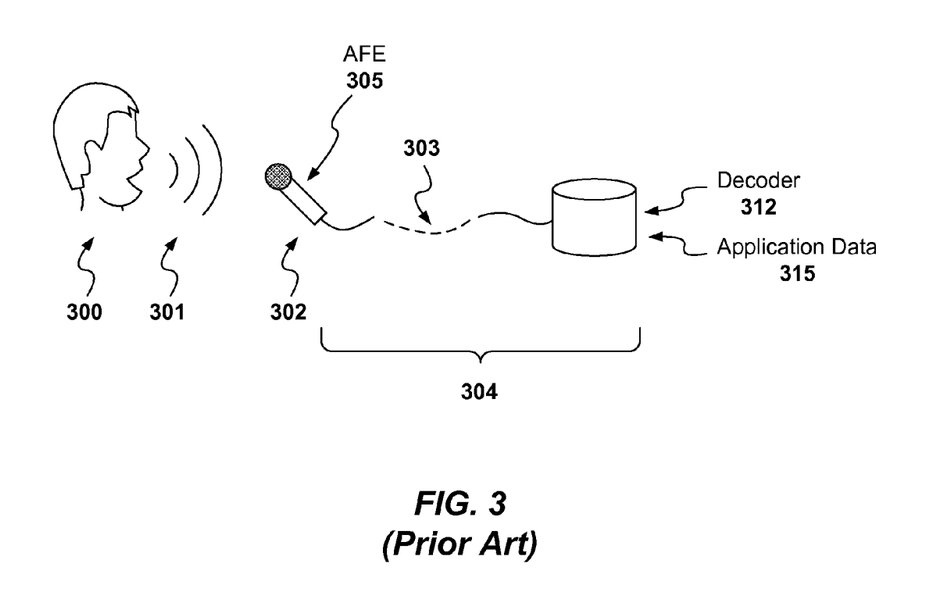
FIG. 3 shows a block-schematic diagram illustrating a known possible resolution to issues arising in the known implementation of FIG. 2.

FIG. 3 shows a known possible resolution to these issues. The speaker 300 generates speech output 301 as before. However, the input device 302 now contains the AFE 305 and extracts the appropriate parameters as before. This has the advantage that signal degradation may decrease and device specific noise modelling may be more effective. In addition, the amount of data to be transmitted via the transmission channel 303 is reduced and these will not be affected by degradation caused by transmission channel effects. The decoder 312 and application data 315 are implemented and are run remotely on the server as before. However, now the overall ASR implementation is distributed 304 between client and server rather than concentrated all on the server side as in FIG. 2 at 204.

This does indeed resolve some issues, but not all. The following example incorporating the present invention addresses the remaining issues by extending both the client side processing and by the use of application data at the server by the decoder.

Figure 4A:
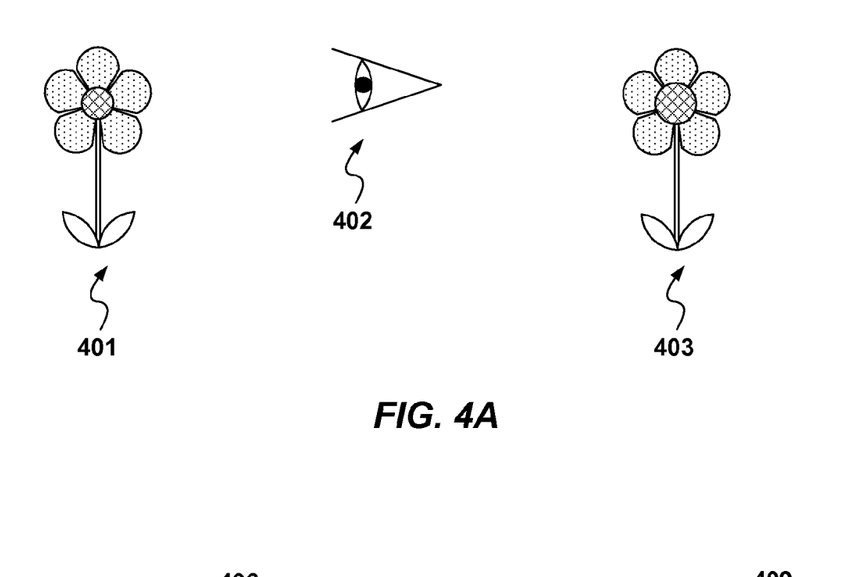
FIG. 4a and FIG. 4b show schematic diagrams illustrating cognitive processing concepts of 'top-down' and 'bottom-up' processing on which the present invention is based.

By way of introduction, FIG. 4 illustrates the cognitive processing concepts of 'top-down' and 'bottom-up' processing. In FIG. 4a, an object 401 is perceived by the appropriate sensory organ 402. Since this is a 'noiseless' environment, all the detail of the object 401 is available such as texture, colour and so forth. In consequence, the appropriate perceptual cortex can theoretically take the image 403 directly from the input 401. In this example, a flower 401 is seen by the eye 402 and processed in all its detail by the visual cortex to produce the image 403 of that particular flower. Most significantly, all detail ("information") can be retrieved from the real object.

Figure 4B:
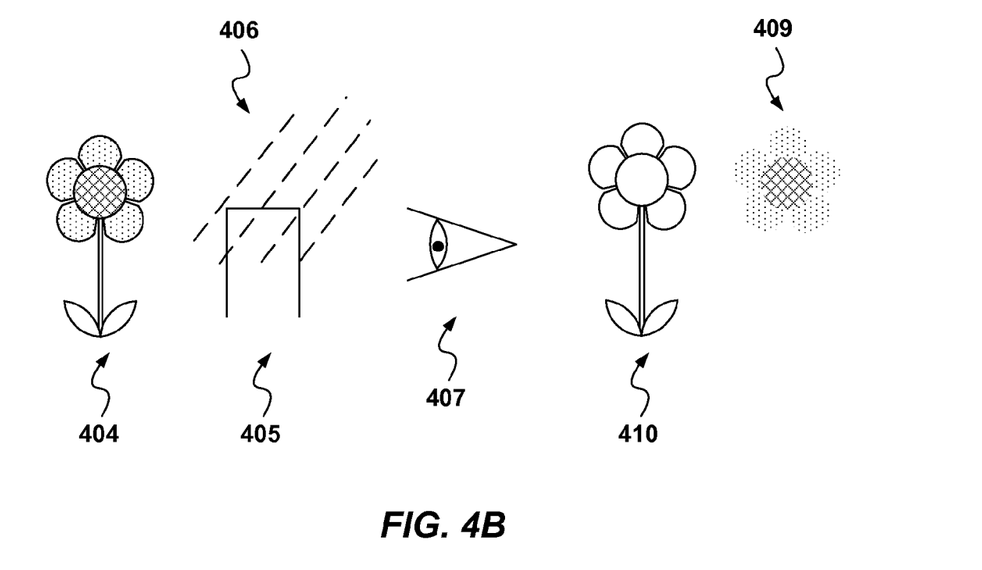

In FIG. 4b, the same scenario is presented with two modifications. First, an object 405 is blocking ('masking') some part of the object 404: the sensory organ 407 completely loses the bottom half of the object 404. Further, because of intermittent blockers 406 (in this case, raindrops) interfering with the rest of the object 404, some of the detail is lost. In consequence, the percept 408 taken directly from the sensory organ 407 is incomplete: it lacks texture because of the intermittent blocking 406 as well as an entire portion of the object because of complete blocking by an object in the way 405. But all is not lost. Cognition does not simply rely on details of the input. Instead, it can use procedural knowledge and experience ('memory') to predict missing input.

Remembering the percept of this particular flower 401, the texture and colour of the intermittently blocked detail can be filled in from memory 409. In addition, because we have experience of other flowers in the world around us, we can predict what is being hidden by the obstruction 405, and fill in the missing portion 410. In practical terms, this is indeed the process, which is believed to take place for all cognitive processes. In simple terms, FIG. 4a represents entirely bottom-up processing: all detail is retrieved from the input stimulus via the sensory organ. FIG. 4b, in terms of 409 and 410, illustrates by contrast top-down processing, since some information has to be filled in from other sources ('memory'). Finally, it is believed that all cognition involves the collaborative interplay between top-down and bottom-up processing. If the external stimuli are presented in a 'noisy' environment (where there is interference), then top-down processing will tend to be weighted more than bottom-up processing. Irrespective of environment, if the result does not make sense, then the bottom-up input is used to validate the top-down result.

Although the above is a simplistic description of cognition, this introduces the preferred embodiment of the present invention, in which distributed processing (see FIG. 3) is extended to include three key elements:

1. At the client-side, the application data (115 in FIG. 1) are replaced by a phonotactic table;
2. At the server side, separate confidence scores (117 in FIG. 1) are tracked for matches against the acoustic model 106 and comparison to the grammar 114;
3. a contention resolver (described below and shown in FIG. 5) weights the client and server results to establish a single output, which represents the collaboration between client-side processing and server-side processing: bottom-up versus top-down processing in our analogy.

Figure 5:
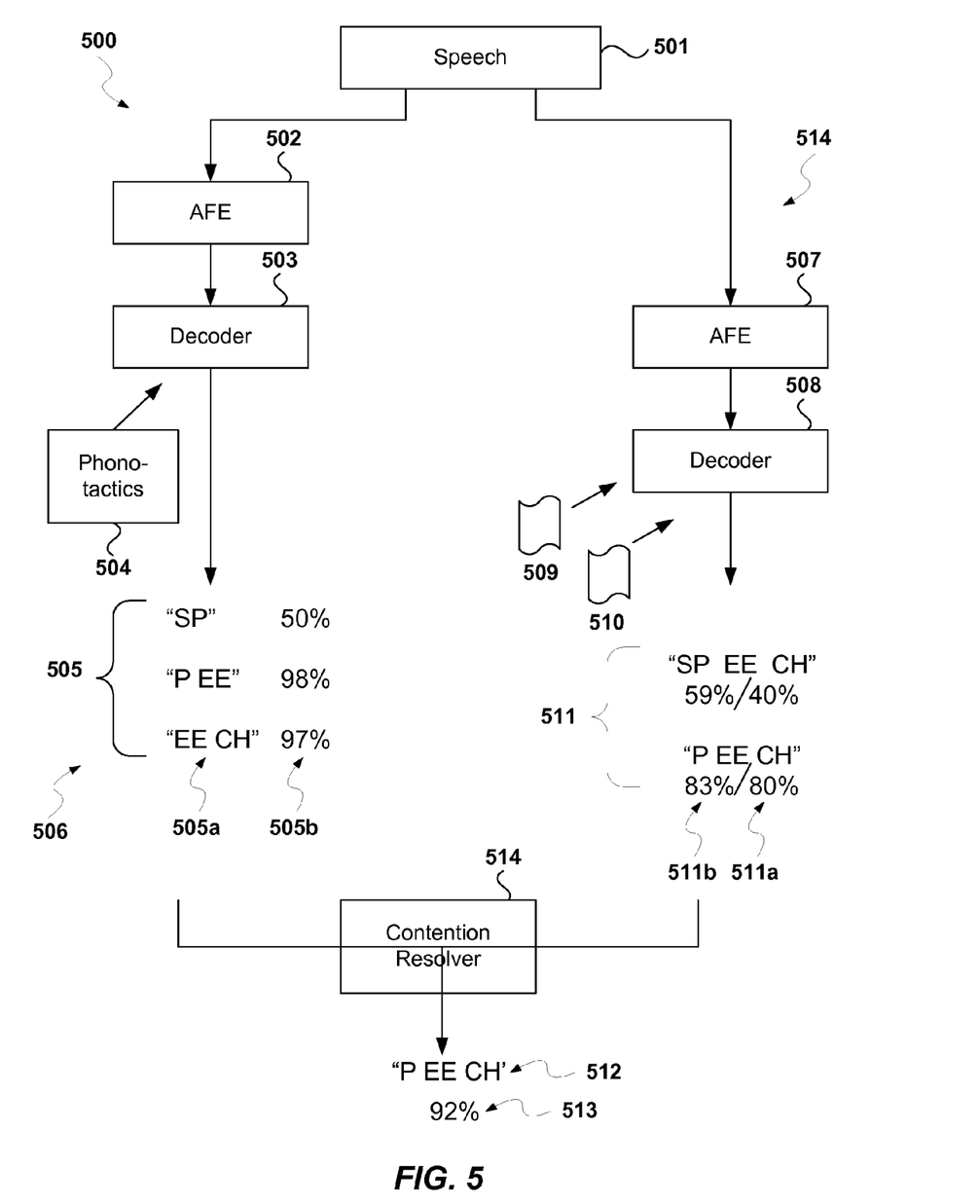
FIG. 5 shows a block-schematic diagram illustrating an ASR system following a preferred embodiment of the present invention.
Figure 6:
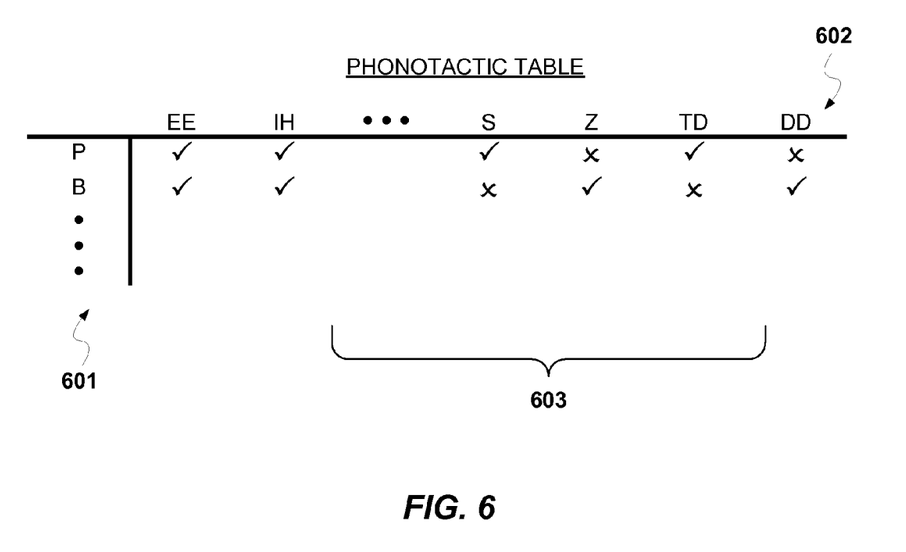
FIG. 6 shows an extract from a phonotactic table containing revised application data used in client-side processing in the system of FIG. 5.

FIG. 5 illustrates a preferred embodiment of the present invention, using an example of audio input which may be confused as either of the words "speech" or "peach"; and FIG. 6 shows an example of the revised application data to be used by the client side of the system of FIG. 5.

According to one aspect of this invention, we provide not simply distributed recognition by splitting the AFE 105 and decoder 112 between the client and server devices as illustrated in FIG. 3, but to implement both the AFE 105 and decoder 112 in both client and server devices. The system 500 of FIG. 5 illustrates this. The client-side path 506 and server-side path 514 process all of the input signal 501 in parallel. On the client side, the AFE 502 is optimised to the specific device and environment for noise suppression; the acoustic model of the decoder 503 is trained for this specific speaker: it is a speaker dependent implementation (requiring training) rather than the speaker-independent decoder 508 at the server. Therefore the results from the client device can be expected to be more accurate for this specific speaker in this specific environment.

The main difference arises in the application data 504. Instead of a grammar 114 and pronunciation dictionary 113 as known in the prior art, a phonotactic table 504 is introduced. FIG. 6 shows an example of the entries in the phonotactic table 504. With reference to FIG. 6, this table shows any given sound 601 and all the sounds of this speaker and language 602, indicating within the cells of the table 603 whether the sound in 601 can (shown by a tick) or cannot (shown with a cross) be followed by sound 602. For example, the "p" in "speech" (P in 601), may be followed by any vowel (EE, IH, etc.) or the consonants S (as in "lips") or TD (as in "wrapped"), but not Z or DD, and so forth. Conversely, "b" in "bed" can also be followed by any vowel. It may also be followed by Z (as in "ribs") and the sound DD (as in "robbed") rather than S or TD, and so forth. In consequence, the decoder 503 in the client process 506 is constrained to return as a result only those sound combinations 505a, which are permissible as defined in the application data 504 (the phonotactic table). For each combination in the result 505 from the client process 506 a confidence value 505b is provided. So, based on the raw input 501 for this speaker using this device, the client process indicates that "S P" may have occurred with a confidence of 50%; but "P EE" with 98% and so forth.

In parallel, the server-side 514 processes as traditionally for the ASR process 100. The application grammar 510 and the associated pronunciation dictionary 509 are exactly the same as before, as is the AFE 507. The decoder 508 differs slightly though, in that the results 511 contain an 'N-best' list (the N best candidate matches based on confidence score—that is cumulative probability across the pathways in the acoustic model). For the pronunciation dictionary 509 a confidence value is given 511a to indicate how confident the recogniser is that the signal represents that sequence of sounds only. But in addition, a separate grammar score 511b is produced which represents how well the hypothetical sequence of sounds 'makes sense' given the grammar 510.

A significant step now occurs. The contention resolver 514 must now decide which of the results 505 and 511 are to be returned. Now the client-side confidence values 505b show how confident for this speaker in this environment the ASR process is that the sound sequence exists. The low confidence 50% for "S P" indicates that the client-side for this speaker in this environment is unsure of the validity of the result. By contrast, "P EE" yields a result of 98%. The speaker-dependent environment specific ASR process for the client 506 is therefore boosting any occurrence of "P" followed by "EE" (and then "EE" followed by "CH"); but questioning any "S P" combination. The server side 514 (speaker-independent as typically implemented with the modification detailed above for confidence values 511a) provides two confidence values per result word: based on grammar 510 and on pronunciation dictionary 509. If the confidence 511a for the grammar 510 is below a given threshold as typically used today (the 'rejection threshold'), then the result may be deemed 'not to make sense'. Therefore, the client side result 505 is given extra prominence. However, the client result 505 identifies the combination "S" followed by "P" to be 'low confidence' and therefore server side results 511 with this combination are queried for their pronunciation confidence 511b. This also being low (59%), the result is suppressed.

In short, the following occurs for each recognition result
1. Results based on the same audio input 501 are generated by client processing 506 and in parallel by server processing 514.
2. If the server side result 511 is associated with a confidence score 511a for the application grammar 510, then the confidence core 511b based on pronunciation 509 is queried.
3. If this server side result 511 associated with pronunciation 509 also has a low score 511b then the client-side results, which make up this word (i.e., "S+P", "P+EE", and "EE+CH") are queried. If these are of low confidence, then the result is rejected: i.e., "S P EE CH" ('speech') is rejected. If an alternative result can be matched, i.e., "P EE CH" ('peach') with high client-side scores, then it is accepted.

Thus the result depends on the interplay of both client 506 and server-side processing 514. When application grammar 510 scores are below the rejection threshold, then the pronunciation 509 scores are examined. When both these scores are low, then only matches from the client side, which yield high scores, are used.

In summary, then, the server-side results 511 will be validated against the client-side 505 in the first instance if the grammar-based confidence score 511a falls below the rejection threshold. It will be suppressed completely if the confidence values 505b for a given sound combination 505a are also low for the client-side (speaker-dependent) process 506. In this way, the cognitive collaboration between top-down and bottom-up processing can be modelled and exploited in a distributed speech recognition task.

It will be appreciated that the distributed voice recognition scheme described above is carried out in software running on processors in computers, and that the software may be provided as computer program elements carried on any suitable data carrier (not shown) such as a magnetic or optical computer disc.

In an alternative embodiment (not illustrated) of the present invention, a distributed voice recognition scheme operates as follows:
1. On a client device:
   (a) front-end processor extracts time slices from incoming audio and extracts relevant parameters (usually a normalised set of 16 cepstral coefficients);
   (b) the quantised vector of coefficients is presented to a Markov model which contains a representation of a universal set of "phoneme" tags, in much the same way as the current move in speech recognition research towards a common phonology across languages.

The output from the client device is a string of phoneme labels, which are transmitted to a back end recognition server as they become available.

1. On a serve as with known ASR engines the server includes:
   (a) a front-end processor as above
   (b) an acoustic model in the form of a Hidden Markov Model (HMM) of the words to be recognised. This could be implemented as a standard grammar-based acoustic model, or a more powerful Natural Language Understanding (NLU)-based Statistical Language Model (SLM)
   (c) a function for matching and weighting of the local and remote results as will be described below.

The server is passed audio data from the client device as known. The server begins to process the audio as it is presented. However, instead of traditional processing whereby the server must depend on the sequence of incoming audio data frames to "walk" through the Markov model along the statistically most likely path or paths, and then retrace the path or paths before deciding on the most likely which is then converted to standard orthography, the server uses the intrinsic prediction capabilities of an HMM chain along with the predictive powers for candidate paths of "phonemic spelling" as represented in, for instance, the known "Werdz" system, to achieve a single pass through the model.

The Werdz system uses the phonemic spelling of a word to find the best possible match of all lexical entries, even where spelling errors have occurred. For instance, if a user writes "ejog", the phonemic spelling of this word will lead to a match with "hedgehog". The output from the list of possible spellings is matched against the SLM to establish which word is most appropriate in the context of this application. Thus the output from Werdz is used to generate the pronunciation dictionary, as in 509, and initialise the phonotactic table 504 on the client-side.

Decoding on the client device transmits phoneme labels as they become available. The server then checks these against its current hypothesis to validate its current path or to modify it (it will be appreciated that this is exactly what happens in top-down and bottom-up processing in cognitive science: the server (top-down) continuously makes predictions of what is being recognised, and will only divert from that if the bottom-up information is at odds with it).

Thus, it will be understood that such a scheme employs:
1. grammar and baseform specification of the local ASR (automatic speech recognition) approach on the basis of the server grammar, but tuned to general language characteristics;
2. matching and weighting of the local and remote results; and
3. forward prediction within the remote ASR process, supported by results from the local ASR engine.

It will be further understood that the effectiveness of the automatic speech recognition in such a scheme can be further enhanced by:
(a) adaptation to the local speaker and device; and
(b) forward prediction explicitly based on known phonotactic information (that is the 'rules' governing which sounds can co-occur in a given language).

In this way, such a scheme provides an efficient method which allows for point-of-entry processing at the device end which avoids problems of transmission loss or corruption (such as GSM encoding for mobile devices) as well as providing predictive sound candidates. The server does not now need to retrace (as in the 'Forward-Backward' algorithm common in ASR), but can exploit the predictive information given in the underlying acoustic or statistical language model.

It will be understood that the novel distributed recognition schemes described above provide the advantage of implementing a model of known cognitive processing whereby perception of an incoming audio (and any type of sensory) signal is the result of the negotiation between bottom-up (that is raw input) and top-down (that is prediction based on past experience) processes. In practical terms, by performing recognition both locally (as a speaker and device dependent activity - but not service specific as described) as well as in parallel performing known and current remote server-based recognition, the recognition result becomes a weighted average of the two results as described.

The invention claimed is:

1. A voice recognition system, comprising:
   an input device configured to receive voice information and produce a first result by comparing the voice information to first predetermined data;
   a remote computer configured to process the voice information to produce a second result by comparing the voice information to second predetermined data, wherein the second result comprises a plurality of possible matches; and
   a contention resolver configured to receive the first result and the second result and to select one of the plurality of possible matches of the second result as an output result, wherein the output result is selected based, at least in part, on the first result;
   wherein the input device is configured to compare the voice information to the first predetermined data so as to produce the first result as at least one sound combination corresponding to less than the entirety of a given word for which the remote computer produces the plurality of possible matches of the second result.

2. The system of claim 1, wherein the input device comprises a first acoustic front end and a first decoder, and the remote computer comprises a second acoustic front end and a second decoder.

3. The system of claim 2, wherein the second decoder is configured to produce the plurality possible matches based on confidence scores.

4. The system of claim 2, wherein the second decoder produces a grammar confidence score for each of the plurality of possible matches; and
   wherein the contention resolver is configured to validate, by using the first result, ones of the plurality of possible matches associated with a grammar confidence score less than a rejection threshold.

5. The system of claim 1, wherein the input device comprises a phonotactic table holding the first predetermined data.

6. The system of claim 1, wherein the remote computer is configured to calculate the confidence scores for the plurality of possible matches against an acoustic model and comparison to a grammar.

7. The system of claim 1, wherein the contention resolver is configured to weight the first result and the plurality of possible matches to select the output result.

8. The system of claim 1, wherein the first result comprises a plurality of sound combinations, each sound combination being associated with a confidence value;
   wherein the contention resolver selects the output result based, at least in part, on the confidence values for sound combinations in each of the plurality of possible matches.

9. A voice recognition method comprising:
   producing, by an input device, a first result by comparing received voice information to first predetermined data;

producing, by a remote computer, a second result by comparing the voice information to second predetermined data, wherein the second result comprises a plurality of possible matches; and selecting one of the plurality of possible matches of the second result as an output result, wherein selection of the output result is based, at least in part, on the first result;

wherein producing the first result comprises comparing the received voice information to the first predetermined data so as to produce the first result as at least one sound combination corresponding to less than the entirety of a given word for which the remote computer produces the plurality of possible matches of the second result.

10. The method of claim 9, wherein producing the first result comprises performing, by the input device, first acoustic front end processing and performing first decoding, and producing the second result comprises performing, by the remote server second acoustic front end processing and performing second decoding.

11. The method of claim 10, wherein performing second decoding comprises producing the plurality of possible matches based on confidence scores.

12. The method of claim 10, wherein performing second decoding comprises producing a grammar confidence score for each of the plurality of possible matches; and wherein selecting one of the plurality of possible matches comprises validating, by using the first result, ones of the plurality of possible matches associated with a grammar confidence score less than a rejection threshold.

13. The method of claim 9, wherein producing the first result comprises using a phonotactic table holding the first predetermined data.

14. The method of claim 9, wherein producing the second result comprises calculating confidence scores for the plurality of possible matches against an acoustic model and comparison to a grammar.

15. The method of claim 9, wherein selecting one of the plurality of possible matches comprises weighting the first result and the plurality of possible matches to select the output result.

16. The method of claim 9, wherein the first result comprises a plurality of sound combinations, each sound combination being associated with a confidence value;

wherein selecting one of the plurality of possible matches further comprises selecting the output result based, at least in part, on the confidence values for sound combinations in each of the plurality of possible matches.

17. A computer-readable storage medium encoded with a plurality of instructions that, when executed by a computer, perform a method of:

producing a first result by comparing received voice information to first predetermined data;

producing a second result by comparing the voice information to second predetermined data, wherein the second result comprises a plurality of possible matches; and selecting one of the plurality of possible matches of the second result as an output result, wherein selection of the output result is based, at least in part, on the first result;

wherein producing the first result comprises comparing the received voice information to the first predetermined data so as to produce the first result as at least one sound combination corresponding to less than the entirety of a given word for which the remote computer produces the plurality of possible matches of the second result.

18. The computer-readable storage medium of claim 17, wherein the producing the first result comprises performing first acoustic front end processing and performing first decoding, and producing the second result comprises performing second acoustic front end processing and performing second decoding.

19. The computer-readable storage medium of claim 18, wherein performing second decoding comprises producing the plurality of possible matches based on confidence scores.

20. The computer-readable storage medium of claim 18, wherein performing second decoding comprises producing a grammar confidence score for each of the plurality of possible matches; and wherein selecting one of the plurality of possible matches comprises validating, by using the first result, ones of the plurality of possible matches associated with a grammar confidence score less than a rejection threshold.

21. The computer-readable storage medium of claim 17, wherein producing the first result comprises using a phonotactic table holding the first predetermined data.

22. The computer-readable storage medium of claim 17, wherein producing the second result comprises calculating confidence scores for the plurality of possible matches against an acoustic model and comparison to a grammar.

23. The computer-readable storage medium of claim 17, wherein selecting one of the plurality of possible matches comprises weighting the first result and the plurality of possible matches to select the output result.

24. The computer-readable storage medium of claim 17, wherein the first result comprises a plurality of sound combinations, each sound combination being associated with a confidence value;

wherein selecting one of the plurality of possible matches further comprises selecting the output result based, at least in part, on the confidence values for sound combinations in each of the plurality of possible matches.

* * * * *